United States Patent
Mirzaei et al.

(10) Patent No.: US 10,715,202 B2
(45) Date of Patent: Jul. 14, 2020

(54) SELF-INTERFERENCE CANCELLATION FOR FULL-DUPLEX COMMUNICATION USING A PHASE AND GAIN ADJUSTED TRANSMIT SIGNAL

(71) Applicant: Avago Technologies International Sales Pte. Limited, Singapore (SG)

(72) Inventors: Alex Mirzaei, Irvine, CA (US); Hooman Darabi, Laguna Niguel, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 16/249,195

(22) Filed: Jan. 16, 2019

(65) Prior Publication Data

US 2019/0222252 A1    Jul. 18, 2019

Related U.S. Application Data

(63) Continuation of application No. 15/792,198, filed on Oct. 24, 2017, now Pat. No. 10,200,080, which is a continuation of application No. 14/722,641, filed on May 27, 2015, now Pat. No. 9,825,665.

(51) Int. Cl.
   *H04B 1/525* (2015.01)
(52) U.S. Cl.
   CPC .................................. *H04B 1/525* (2013.01)
(58) Field of Classification Search
   CPC ...................................................... H04B 1/525
   See application file for complete search history.

(56) References Cited

U.S. PATENT DOCUMENTS

| | | | |
|---|---|---|---|
| 9,236,892 B2* | 1/2016 | Dupuy | H04B 1/0475 |
| 9,430,683 B1* | 8/2016 | Hyde | G06K 19/0723 |
| 9,825,665 B2 | 11/2017 | Mirzaei et al. | |
| 2007/0037544 A1* | 2/2007 | Heikkinen | H03F 1/32 |
| | | | 455/323 |
| 2013/0301487 A1 | 11/2013 | Khandani | |
| 2014/0348018 A1 | 11/2014 | Bharadia et al. | |
| 2015/0303984 A1* | 10/2015 | Braithwaite | H04B 1/525 |
| | | | 455/78 |
| 2016/0094379 A1* | 3/2016 | Grasso | H03D 3/009 |
| | | | 375/320 |
| 2016/0134380 A1 | 5/2016 | Kim et al. | |
| 2016/0266245 A1 | 9/2016 | Bharadia et al. | |
| 2016/0285502 A1 | 9/2016 | Liu | |
| 2018/0145719 A1 | 5/2018 | Mirzaei et al. | |

* cited by examiner

*Primary Examiner* — Bo Hui A Zhu
(74) *Attorney, Agent, or Firm* — Xsensus LLP (57) ABSTRACT

The present disclosure is directed to an apparatus and method for cancelling self-interference caused by full-duplex communication. In a full-duplex communication device, the receiver will generally experience significant self-interference from the full-duplex communication device's own transmitter transmitting a strong outbound signal over the same channel that the receiver is to receive a weak inbound signal. The apparatus and method are configured to adjust a phase and gain of the outbound signal provided at the output of a power amplifier (PA) and inject the phase and gain adjusted outbound signal at the input of a low-noise amplifier (LNA) to cancel the interference from the outbound signal in the inbound signal.

19 Claims, 5 Drawing Sheets

(Self-Interference Cancellation)

FIG. 1 (Isolation by Frequency Selection)

FIG. 2 (Isolation by Electrical Balance)

FIG. 3 (Self-Interference Cancellation)

FIG. 4 (Self-Interference Cancellation)

FIG. 5 (Self-Interference Cancellation)

SELF-INTERFERENCE CANCELLATION FOR FULL-DUPLEX COMMUNICATION USING A PHASE AND GAIN ADJUSTED TRANSMIT SIGNAL

CROSS REFERENCE TO RELATED APPLICATIONS

This application is a continuation of U.S. patent application Ser. No. 15/792,198, filed Oct. 24, 2017, which is a continuation of U.S. patent application Ser. No. 14/722,641, filed May 27, 2015, both of which are incorporated herein by reference in their entirety.

TECHNICAL FIELD

This application relates generally to self-interference cancellation, including self-interference cancellation for full-duplex communication.

BACKGROUND

A duplex communication system includes two transceivers that communicate with each other over a channel in both directions. There are two types of duplex communication systems: half-duplex communication systems and full-duplex communication systems. In half-duplex communication systems, the two transceivers communicate with each other over the channel in both directions but only in one direction at a time; that is, only one of the two transceivers transmits at any given point in time, while the other receives. A full-duplex communication system, on the other hand, does not have such a limitation. Rather, in a full-duplex communication system, the two transceivers can communicate with each other over the channel simultaneously in both directions.

Wireless communication systems often emulate full-duplex communication. For example, in some wireless communication systems two transceivers communicate with each other simultaneously in both directions using two different carrier frequencies or channels. This scheme, where communication is carried out simultaneously in both directions using two different carrier frequencies, is referred to as frequency division duplexing (FDD). FDD is said to only emulate full-duplex communication because FDD uses two half-duplex channels rather than a single channel to accomplish simultaneous communication in both directions.

Although emulated full-duplex communication using FDD allows for simultaneous communication in both directions, it requires two channels. True full-duplex communication eliminates the need for one of these two channels, resulting in increased spectrum efficiency. The difficulty with true full-duplex communication, and the reason why it has not become common place in wireless and mobile communication standards to date, is the significant interference that the receiver of a full-duplex communication device will generally experience from the full-duplex communication device's own transmitter transmitting over the same channel that the receiver is to receive signals. This interference is referred to as self-interference because the interference experienced by the receiver originates from its own paired transmitter.

For example, in some communication systems, signals can be transmitted at power levels as high as 25 dBm and signals can be received at power levels as low as −100 dBm. At these levels, the self-interference needs to be reduced by at least 25 dBm−(−100 dBm)=125 dBm to allow for information to be recovered from the received signals.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include software, firmware, or hardware (such as one or more circuits, microchips, processors, and/or devices), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Overview

The present disclosure is directed to an apparatus and method for cancelling self-interference caused by full-duplex communication. In a full-duplex communication device, the receiver will generally experience significant self-interference from the full-duplex communication device's own transmitter transmitting a strong outbound signal over the same channel that the receiver is to receive a weak inbound signal. The apparatus and method are configured to adjust a phase and gain of the outbound signal provided at the output of a power amplifier (PA) and inject the phase and gain adjusted outbound signal at the input of a low-noise amplifier (LNA) to cancel interference from the outbound signal in the inbound signal. In one embodiment, the apparatus and method use a passive network of resistors and capacitors to generate the phase and gain adjusted outbound signal. Before further describing these and other features of the present disclosure, some of the current self-interference suppression techniques are first described below.

2. Current Self-Interference Suppression Techniques

The problem of self-interference is not unique to true full-duplex communication systems. For example, emulated full-duplex communication systems using FDD similarly suffer from self-interference, although effectively to a lesser degree due to the use of separate channels for each direction of communication. Provided below is a description of some of the specific techniques used in emulated full-duplex communication systems to cope with self-interference, as well as a high-level description of some of the self-interference suppression techniques developed specifically for true full-duplex communication systems.

Figure 1:
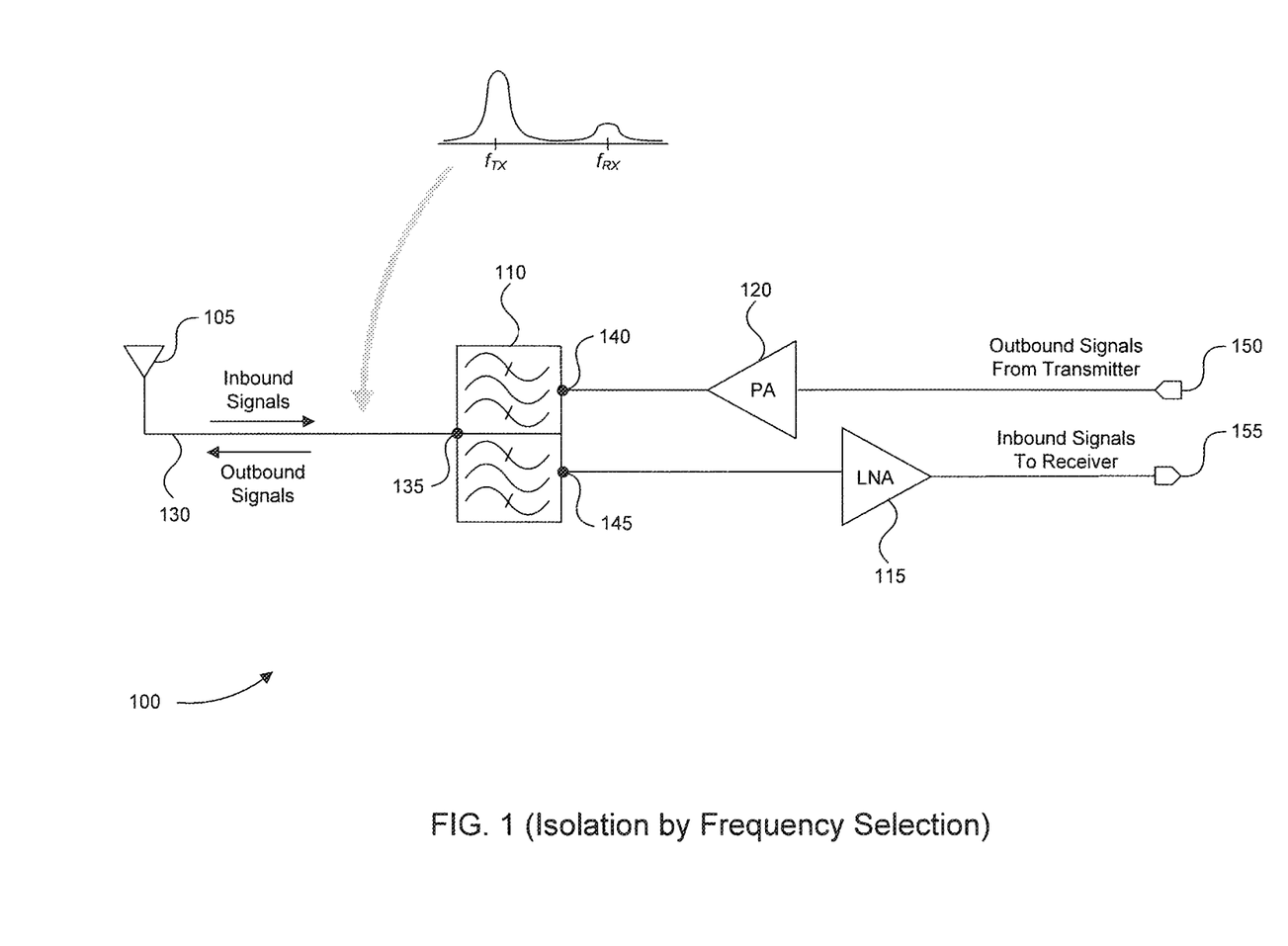
FIG. 1 illustrates a block diagram of an example RF front-end configured to emulate full-duplex communication using FDD.

Referring now to FIG. 1, a block diagram of an example RF front-end 100 configured to emulate full-duplex communication using FDD is illustrated. RF front-end 100 includes an antenna 105, a duplexer 110, a low-noise amplifier (LNA) 115, and a power amplifier (PA) 120. In operation, RF front-end 100 transmits outbound signals and receives inbound signals simultaneously over different channels (i.e. carrier frequencies). For example, as illustrated in FIG. 1, both inbound and outbound signals are simultaneously coupled between antenna 105 and duplexer 110 over a common signal path 130. The inbound signals are received at a carrier frequency $f_{RX}$ that is different from the carrier frequency $f_{TX}$ at which the comparatively stronger outbound signals are transmitted.

In such an arrangement, duplexer 110 is used to couple common signal path 130 to both the input of LNA 115 and to the output of PA 120. Duplexer 110 provides the necessary coupling, while preventing the strong outbound signals, produced by PA 120, from being coupled to the input of LNA 115. In general, despite the fact that the outbound signals and the inbound signals are transmitted over different carrier frequencies, duplexer 110 is needed because the strong outbound signals can still saturate LNA 115, leading to gain compression.

As illustrated in FIG. 1, duplexer 110 is a three-port device having an antenna port 135, a transmit port 140, and a receive port 145. Antenna port 135 is coupled to transmit port 140 through a transmit band-pass filter, included in duplexer 110, and to receive port 145 through a receive band-pass filter, further included in duplexer 110. The pass band of the transmit filter is centered within the frequency range of the outbound signals, which are received at node 150 from a transmitter (not shown). The pass band of the receive filter is centered within the frequency range of the inbound signals, which are passed to a receiver (not shown) at node 155. The transmit and receive band-pass filters are configured such that their respective stop bands overlap with each other's pass bands. In this way, the band-pass filters isolate the input of LNA 115 from the strong outbound signals produced by PA 120, as well as the output of PA 120 from the received inbound signals. In typical implementations, duplexer 110 must attenuate the strong outbound signals by about 50-60 dB to prevent the outbound signals from saturating LNA 115.

Although effective for RF front-ends that transmit outbound signals and receive inbound signals over different, non-overlapping portions of a particular frequency band, this frequency selective method of isolation generally will not work for RF front-ends that implement true full-duplex communication. This is because in true full-duplex communication the transmitted outbound signals and the received inbound signals overlap in frequency and therefore cannot be isolated from one another in this regard.

Figure 2:
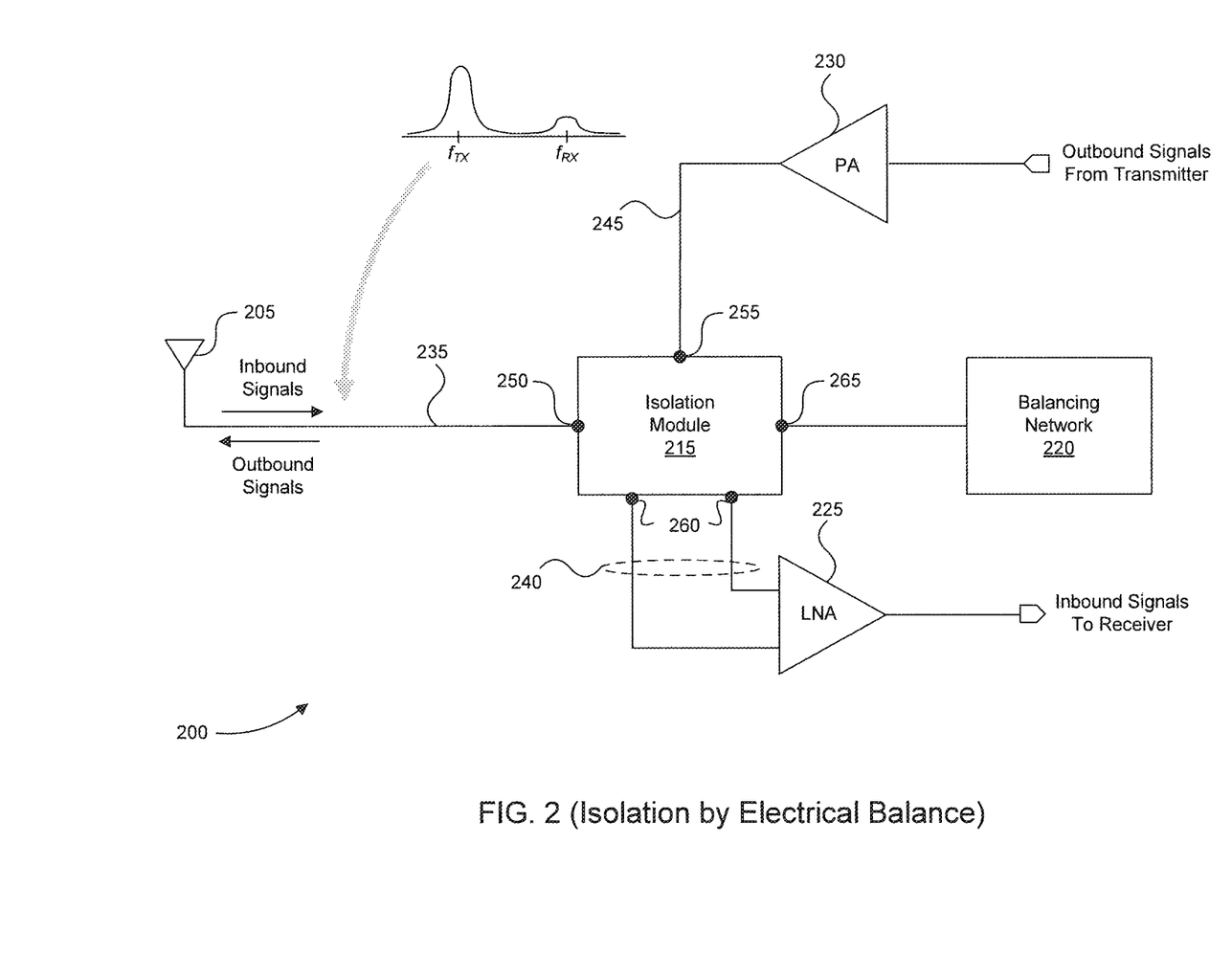
FIG. 2 illustrates a block diagram of an example RF front-end configured to emulate full-duplex communication using FDD.

FIG. 2 illustrates a block diagram of another RF front-end 200 configured to provide emulated full-duplex communication. Unlike RF front-end 100, illustrated in FIG. 1, which provides isolation using frequency selection, RF front-end 200 provides isolation using electrical balance. RF front-end 200 includes an antenna 205, an isolation module 215, a balancing network 220, an LNA 225, and a PA 230. In operation, RF front-end 200 transmits outbound signals and receives inbound signals simultaneously over different channels or carrier frequencies. For example, as illustrated in FIG. 2, both inbound and outbound signals are simultaneously coupled between antenna 205 and isolation module 215 over a common signal path 235. The inbound signals are received at a carrier frequency $f_{RX}$ that is different from the carrier frequency $f_{TX}$ at which the comparatively stronger outbound signals are transmitted.

In such an arrangement, isolation module 215 is used to couple common signal path 235 to a differential input 240 of LNA 225 and to an output 245 of PA 230. Isolation module 215 provides the necessary coupling, while preventing strong outbound signals that are provided by PA 230 from saturating LNA 225. Despite the fact that the outbound signals and the inbound signals are transmitted over non-overlapping portions of a particular frequency band, isolation module 215 is needed for the same reason RF front-end 100 in FIG. 1 needs duplexer 110: because the strong outbound signals can saturate LNA 225, leading to gain compression.

Isolation module 215 is specifically implemented as a four-port device having an antenna port 250, a transmit port 255, a differential receive port 260, and a balance port 265. Isolation module 215, in conjunction with balancing network 220, is configured to isolate transmit port 255 from differential receive port 260 by electrical balance. Specifically, the current of the strong outbound signals provided by PA 230 at transmit port 255 is split by isolation module 215, with a first portion of the current directed towards antenna 205 for transmission, and a second portion of the current directed towards balancing network 220, where its associated energy is dissipated (as heat). In the ideal situation, balancing network 220 is configured to provide an impedance substantially equal to that of antenna 205 such that the first portion and second portion of current are equal (i.e., each are exactly one-half the total current of the strong outbound signals sourced by PA 230) and result in equal voltages on the differential ends of LNA 225. In this way, isolation module 215 can effectively isolate differential input 240 of LNA 225 from the strong outbound signals.

Although electrical balance can be used in a similar manner to isolate the strong output signals from the weak inbound signals in RF front-ends that implement true full-duplex communication, up to half of the signal energy produced by PA 230 is dissipated by balance network 220. As a result, the outbound signals provided by PA 230 suffer a dissipation loss of around 3 dB (or half).

Current self-interference suppression techniques developed specifically for true full-duplex communication systems attempt to provide required high-levels of self-interference suppression using complex designs that include, for example, one or more additional transmit antennas to effectively perform spatial multiplexing or a series of fixed delay lines and variable attenuators to recreate the self-interference for cancelling the actual self-interference in the received signal. These approaches are not only overly complex, but are often not practical for many applications, such as mobile wireless devices that have small form factors.

Figure 3:
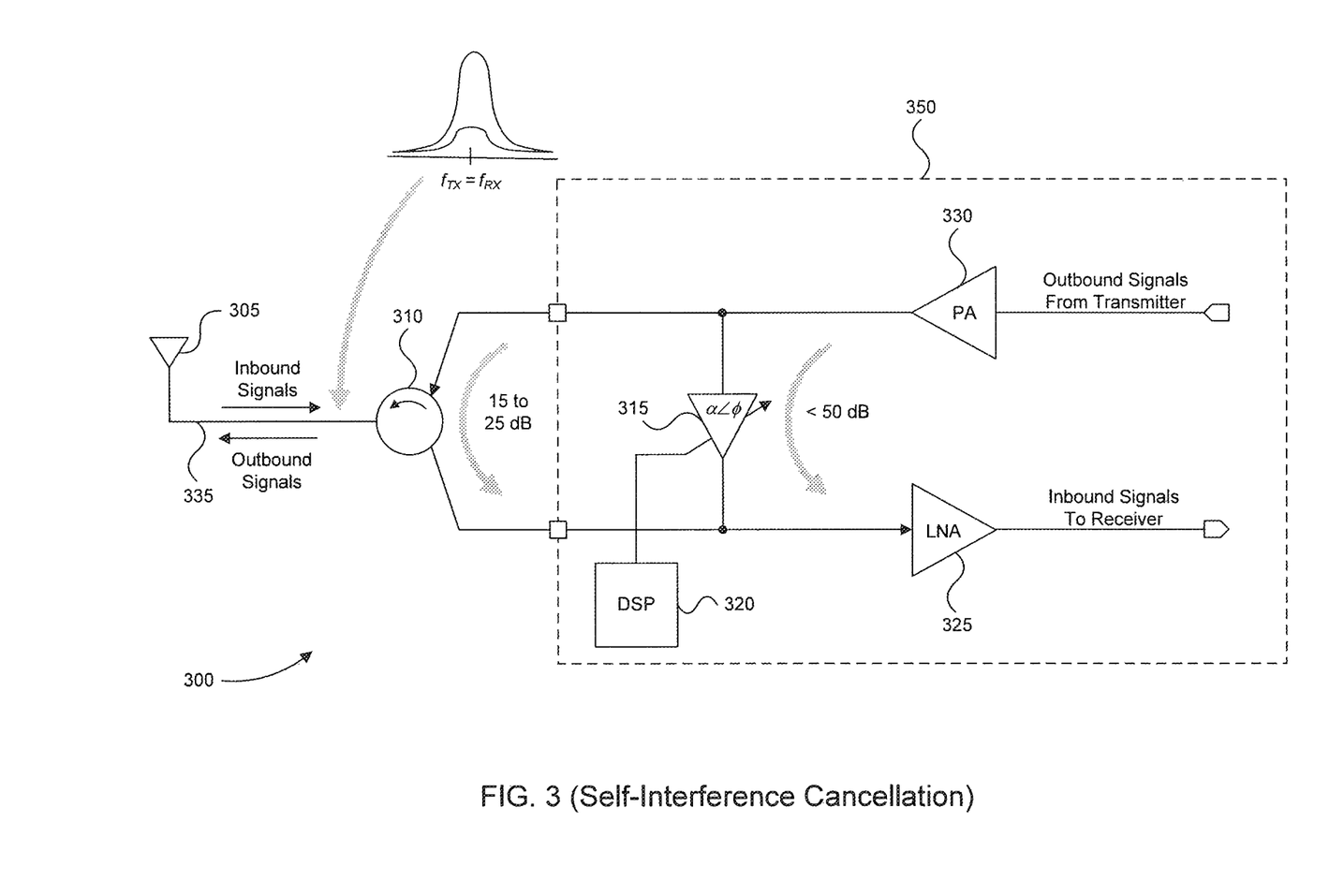
FIG. 3 illustrates a block diagram of an example RF front-end configured to perform true full-duplex communication in accordance with embodiments of the present disclosure.

3. Self-Interference Cancellation Using A Phase and Gain Adjusted Outbound Signal FIG. 3 illustrates a block diagram of an example RF front-end 300 configured to perform true full-duplex communication in accordance with embodiments of the present disclosure. RF front-end 300 can be used in any wireless transceiver, including those for cellular and wireless local area network communications. RF front-end 300 includes an antenna 305, an optional circulator 310, a self-interference cancellation module 315 controlled by a digital signal processor (DSP) 320, a LNA 325, and a PA 330.

In operation, RF front-end 300 transmits outbound signals and receives inbound signals simultaneously over the same channel or carrier frequency. For example, as illustrated in FIG. 3, both inbound and outbound signals are simultaneously coupled between antenna 305 and optional circulator 310 over a common signal path 335. The inbound signals are received at a carrier frequency $f_{RX}$ that is the same as the carrier frequency $f_{TX}$ at which the comparatively stronger outbound signals are transmitted (i.e., $f_{TX}=f_{RX}$).

In such an arrangement, optional circulator 310 is used to couple common signal path 335 to both the input of LNA 325 and to the output of PA 330. Optional circulator 310 provides the necessary coupling, while preventing to some degree the strong outbound signals, produced by PA 330, from being coupled to the input of LNA 325. In the case of full-duplex RF front-end 300, optional circulator 310 is used to not only help prevent the strong outbound signal from saturating LNA 325, but also to help prevent the strong outbound signal from directly interfering with the weak inbound signal that it overlaps with in frequency.

As discussed above, the difficulty with true full-duplex communication, and the reason why it has not become common place in wireless and mobile communication standards to date, is the significant interference that the receiver of a full-duplex communication device will generally experience from the full-duplex communication device's own transmitter transmitting over the same channel that the receiver is to receive signals. For example, in some communication systems, signals can be transmitted at power levels as high as 25 dBm and signals can be received at power levels as low as −100 dBm. At these levels, the self-interference needs to be reduced by at least 25 dBm−(−100 dBm)=125 dBm to allow for information to be recovered from the received signals.

Although optional circulator 310 can help to reduce self-interference in the inbound signal coupled to the input of LNA 325, optional circulator 310 can generally only provide around 15 to 25 dB of isolation, which is too low for many operating conditions to allow for full-duplex communication with a spectral efficiency gain over emulated full-duplex communication using FDD.

Self-interference cancellation module 315 can help to further bridge this gap. More specifically, self-interference cancellation module 315 is configured to adjust a phase and gain of the outbound signal, provided at the output of PA 330, and inject the phase and gain adjusted outbound signal at the input of LNA 325 to cancel interference from the outbound signal in the inbound signal. The phase of the outbound signal can be specifically adjusted to effectively invert the outbound signal and delay the outbound signal to match the delay of the interference from the outbound signal in the inbound signal at the input of LNA 325. The gain can be adjusted to match the magnitude of the interference from the outbound signal in the inbound signal at the input of LNA 325. DSP 320 can specifically be used to set and dynamically adapt the value of the phase and gain adjustment provided by self-interference cancellation module 315.

It can be shown that, for channels as wide as 70 MHz, self-interference cancellation module 315 can provide over 35 dB of additional isolation. It can be further shown that self-interference cancellation module 315 can be fully implemented on a monolithic integrated circuit (IC) 350 together with DSP 320, LNA 325, and optionally PA 330.

Figure 4:
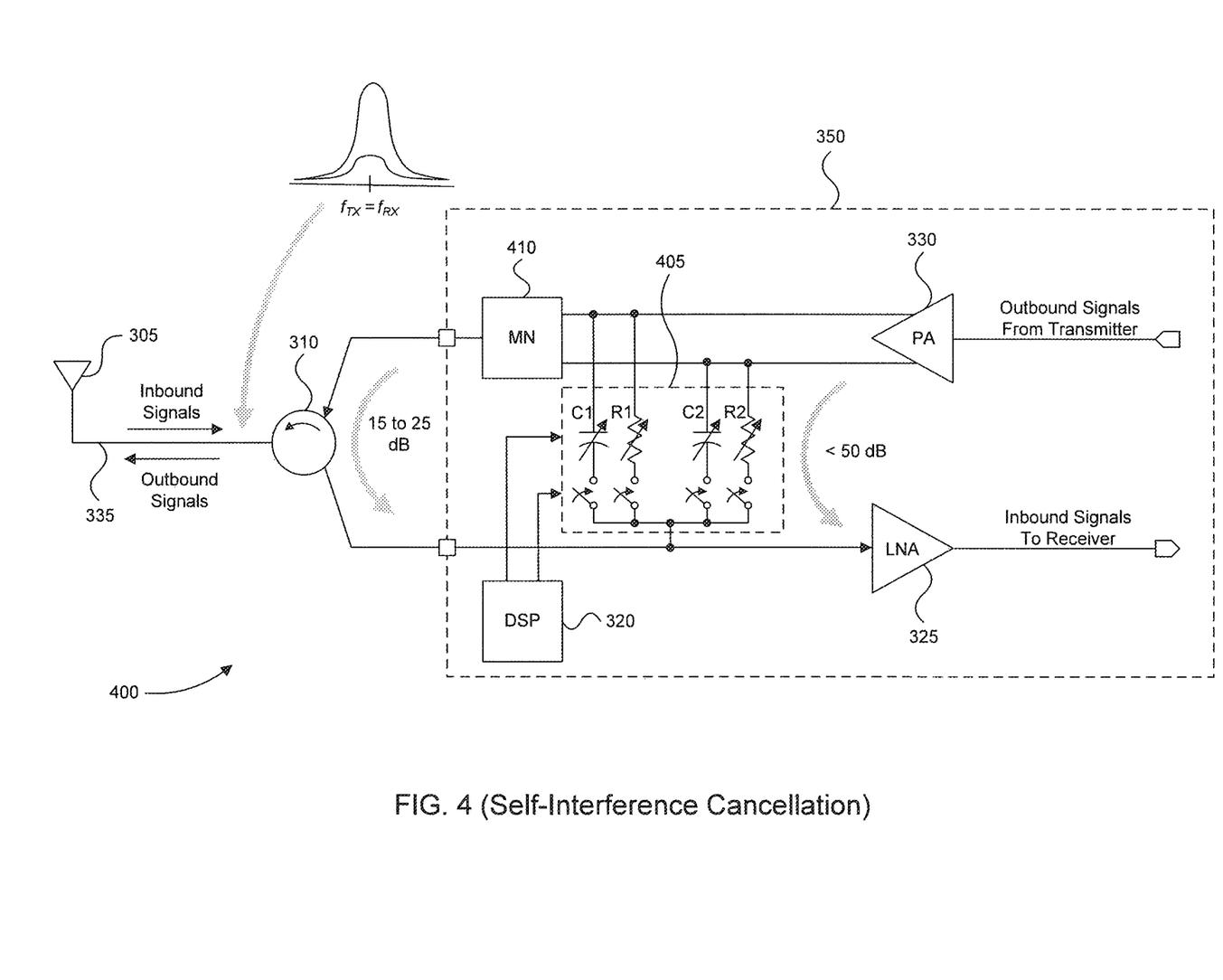
FIG. 4 illustrates another block diagram of an example RF front-end configured to perform true full-duplex communication in accordance with embodiments of the present disclosure.

Referring now to FIG. 4, another block diagram of an example RF front-end 400 is illustrated in accordance with embodiments of the present disclosure. RF front-end 400 has a similar configuration as RF front-end 300 but includes a specific implementation of self-interference cancellation module 405 and a matching network (MN) 410. In general, the output of PA 330 is often differential and coupled to antenna 305 via matching network 410, which is used to help increase the transfer of power from PA 330 to antenna 305 and reduce reflections from antenna 305 back towards PA 330.

As shown in FIG. 4, self-interference cancellation module 405 includes four passive elements and four switches. In particular, self-interference cancellation module 405 includes two variable resistors R1 and R2 that are each controllably coupled between the input of LNA 325 and a respective differential end of PA 330 via a switch. In addition, self-interference cancellation module 405 further includes two variable capacitors C1 and C2 that are each controllably coupled between the input of LNA 325 and a respective differential end of PA 330 via a switch.

DSP 320 can independently adjust the resistances of resistors R1 and R2, the capacitances of capacitors C1 and C2, and the configuration of the four switches (i.e., whether each switch is opened or closed) to adjust the phase and gain of the outbound signal, provided at the output of PA 330, and inject the resulting phase and gain adjusted outbound signal at the input of LNA 325 to cancel interference from the outbound signal in the inbound signal. The phase of the outbound signal can specifically be adjusted to effectively invert the outbound signal and delay the outbound signal to match the delay of the interference from the outbound signal in the inbound signal at the input of LNA 325. The gain can be adjusted to match the magnitude of the interference from the outbound signal in the inbound signal at the input of LNA 325.

As will be appreciated by one of ordinary skill in the art, self-interference cancellation module 405 provides full flexibility in terms of phase adjustment of the outbound signal. For example, assuming that the top most differential end of PA 330 provides the outbound signal at +90 degrees and the bottom most differential end of PA 330 provides the outbound signal at −90 degrees, one of the following four switch configurations can be used based on the desired phase shift:

1. For a desired phase shift between 0-90 degrees, R1 and C1 can be coupled between LNA 325 and PA 330 by closing their respective switches and R2 and C2 can be decoupled between LNA 325 and PA 330 by opening their respective switches.
2. For a desired phase shift between 90-180 degrees, R2 and C1 can be coupled between LNA 325 and PA 330 by closing their respective switches and R1 and C2 can be decoupled between LNA 325 and PA 330 by opening their respective switches.
3. For a desired phase shift between 180-270 degrees, R2 and C2 can be coupled between LNA 325 and PA 330 by closing their respective switches and R1 and C1 can be decoupled between LNA 325 and PA 330 by opening their respective switches.
4. For a desired phase shift between 270-360 degrees, R1 and C2 can be coupled between LNA 325 and PA 330 by closing their respective switches and R2 and C1 can be decoupled between LNA 325 and PA 330 by opening their respective switches.

Figure 5:
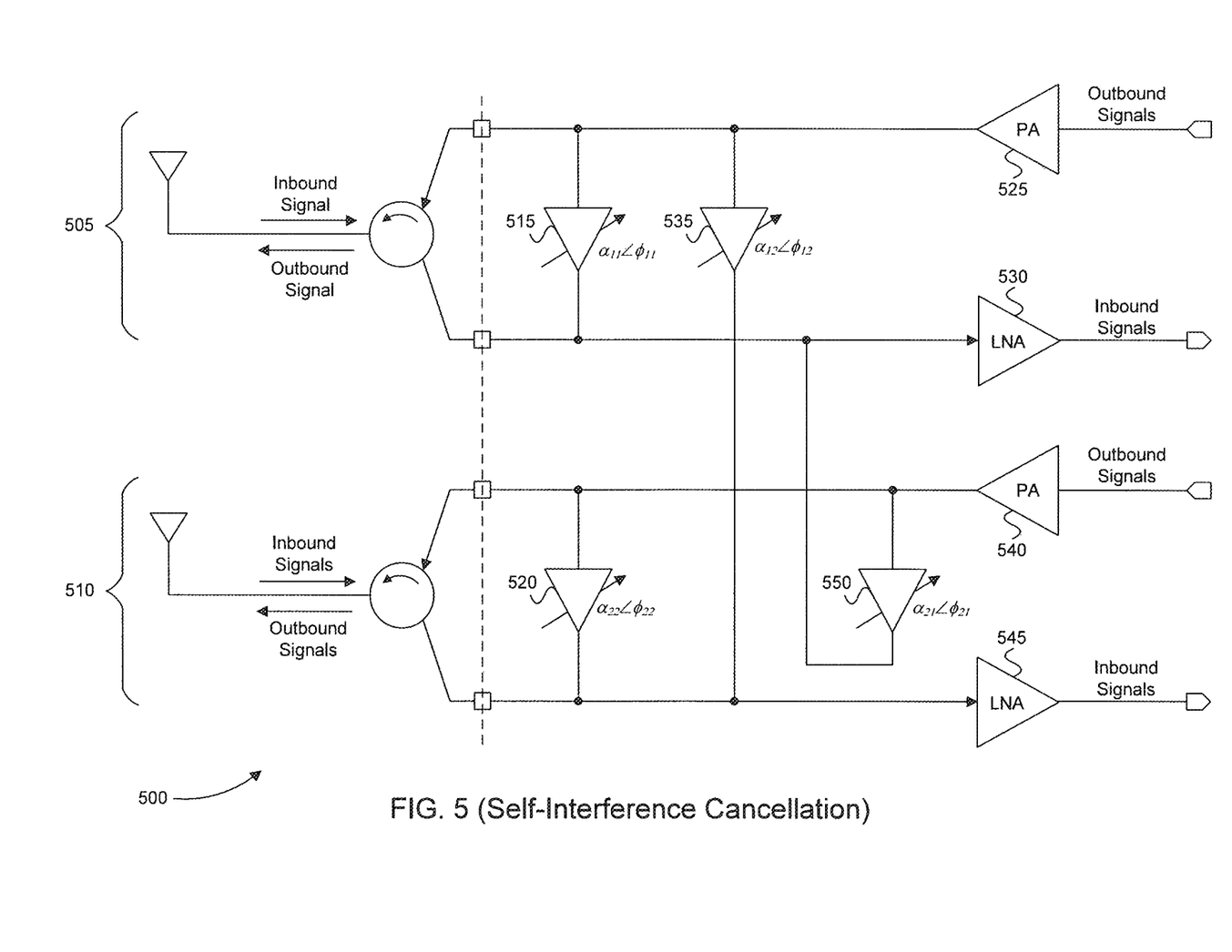
FIG. 5 illustrates a block diagram of an example MIMO RF front-end configured to perform true full-duplex communication in accordance with embodiments of the present disclosure.

Referring now to FIG. 5, a block diagram of a multiple-input, multiple-output (MIMO) RF front-end 500 is illustrated in accordance with embodiments of the present disclosure. In MIMO RF front-end 500, two single-antenna RF front-ends 505 and 510 are used to perform a multi-antenna technique, such as beamforming or spatial multiplexing. MIMO RF front-end 500 can be used in any wireless transceiver, including those for cellular and wireless local area network communications.

As shown in FIG. 5, single antenna RF front-ends 505 and 510 each have a substantially similar structure as RF front-end 300 in FIG. 3, but each includes an additional self-interference cancellation module for every other RF front-end within MIMO RF front-end 500. Because exemplary MIMO RF front-end 500 includes only two, single antenna RF front-ends 505 and 510, each single antenna RF front-end 505 and 510 includes only one additional self-interference cancellation module.

More specifically, single antenna RF front-end 505 includes a self-interference cancellation module 515 that is used in the same manner as self-interference cancellation module 315 in FIG. 3 to adjust a phase and gain of the outbound signal, provided at the output of its own PA 525, and inject the phase and gain adjusted outbound signal at the input of its own LNA 530 to cancel interference.

In addition, RF front-end 505 includes a self-interference cancellation module 535 that is used to adjust a phase and gain of the outbound signal, provided at the output of its own PA 525, and inject the phase and gain adjusted outbound signal at the input of LNA 545 to cancel interference. Self-interference cancellation module 535 can specifically adjust the phase of the outbound signal, provided at the output of PA 525, to effectively invert and delay the outbound signal to match the delay of the interference from the outbound signal in the inbound signal at the input of LNA 545. Self-interference cancellation module 535 can further adjust the gain of the outbound signal, provided at the output of PA 525, to match the magnitude of the interference from the outbound signal in the inbound signal at the input of LNA 545.

Single antenna RF front-end 510 includes a self-interference cancellation module 520 that is used in the same manner as self-interference cancellation module 315 in FIG. 3 to adjust a phase and gain of the outbound signal, provided at the output of its own PA 540, and inject the phase and gain adjusted outbound signal at the input of its own LNA 545 to cancel interference.

In addition, RF front-end 510 includes a self-interference cancellation module 550 that is used to adjust a phase and gain of the outbound signal, provided at the output of its own PA 540, and inject the phase and gain adjusted outbound signal at the input of LNA 530 to cancel interference. Self-interference cancellation module 550 can specifically adjust the phase of the outbound signal, provided at the output of PA 540, to effectively invert and delay the outbound signal to match the delay of the interference from the outbound signal in the inbound signal at the input of LNA 530. Self-interference cancellation module 550 can further adjust the gain of the outbound signal, provided at the output of PA 540, to match the magnitude of the interference from the outbound signal in the inbound signal at the input of LNA 530.

It should be noted that MIMO RF front-end 500 is provided by way of example and not limitation. Other MIMO RF front-ends 500 can include more than two single antenna RF front-ends as would be appreciated by a person of ordinary skill in the art. It should be further noted that one or more DSPs can be used to control self-interference cancellation modules 515, 520, 535, and 550 similar to DSP 320 described above in regard to FIG. 3. Finally, it should be noted that each of self-interference cancellation modules 515, 520, 535, and 550 can be implemented similar to self-interference cancellation module 405 in FIG. 4 using a network of passive elements and switches.

4. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An apparatus comprising:
a power amplifier (PA) configured to provide an outbound signal at a differential output of the PA;
a low-noise amplifier (LNA) configured to receive an inbound signal at an input of the LNA; and
a self-interference cancellation module configured to generate a phase and gain adjusted outbound signal and inject the phase and gain adjusted outbound signal at the input of the LNA, wherein the self-interference cancellation module includes switches configured to adjust the phase of the outbound signal by controllably coupling passive elements between the input of the LNA and the differential output of the PA,
wherein the passive elements include a first adjustable resistance controllably coupled between a first differential end of the differential output of the PA and the input of the LNA, and a first adjustable capacitance controllably coupled between the first differential end of the differential output of the PA and the input of the LNA.

2. The apparatus of claim 1, further comprising a digital signal processor (DSP) configured to control adjustment of the phase and gain of the outbound signal provided at the differential output of the PA based on a phase and gain of the interference from the outbound signal in the inbound signal.

3. The apparatus of claim 1, wherein the passive elements include:
one or more first passive components, coupled between the differential output of the PA and the input of the LNA, to generate a capacitance between the differential output of the PA and the input of the LNA; and
one or more second passive components, coupled between the differential output of the PA and the input of the LNA, to generate a resistance between the differential output of the PA and the input of the LNA.

4. The apparatus of claim 3, wherein the one or more first passive components and the one or more second passive components are configured to be adjusted to adjust the gain and phase of the outbound signal.

5. The apparatus of claim 1, wherein the apparatus is a wireless transceiver further comprising an antenna coupled to the differential output of the PA and coupled to the input of the LNA.

6. The apparatus of claim 1, wherein the passive elements further include:
a second adjustable resistance controllably coupled between a second differential end of the differential output of the PA and the input of the LNA; and
a second adjustable capacitance controllably coupled between the second differential end of the differential output of the PA and the input of the LNA.

7. An apparatus comprising:
a first self-interference cancellation module configured to inject a phase and gain adjusted version of a first outbound signal, provided at an output of a first power amplifier (PA), at an input of a low-noise amplifier (LNA) to cancel interference from the first outbound signal in an inbound signal; and
a second self-interference cancellation module configured to inject a phase and gain adjusted version of a second outbound signal, provided at an output of a second PA, at the input of the LNA to cancel interference from the second outbound signal in the inbound signal.

8. The apparatus of claim 7, wherein the first self-interference cancellation module is configured to adjust the phase and gain of the first outbound signal based on a phase and gain of the interference from the first outbound signal in the inbound signal.

9. The apparatus of claim 7, wherein the first self-interference cancellation module includes a resistance and a capacitance.

10. The apparatus of claim 9, wherein the resistance and the capacitance are configured to be adjusted to adjust the gain and phase of the first outbound signal.

11. The apparatus of claim 7, wherein the first self-interference cancellation module includes:
one or more first passive components, coupled between the output of the first PA and the input of the LNA, to generate a capacitance between the output of the PA and the input of the LNA; and
one or more second passive components, coupled between the output of the first PA and the input of the LNA, to generate a resistance between the output of the first PA and the input of the LNA,
wherein the one or more first passive components and the one or more second passive components are configured to be adjusted to adjust the gain and phase of the first outbound signal.

12. The apparatus of claim 7, wherein the apparatus is a multi-input multi-output (MIMO) RF front-end, further comprising:
a first antenna coupled to the output of the first PA and the input of the LNA; and
a second antenna coupled to the output of the second PA.

13. The apparatus of claim 7, further comprising a digital signal processor (DSP) configured to control adjustment of the phase and gain of the first outbound signal provided at the output of the first PA based on a phase and gain of the interference from the first outbound signal in the inbound signal.

14. The apparatus of claim 13, wherein the DSP is further configured to control adjustment of the phase and gain of the second outbound signal provided at the output of the second PA based on a phase and gain of the interference from the second outbound signal in the inbound signal.

15. An apparatus comprising:
a power amplifier (PA) configured to provide an outbound signal at a differential output of the PA;
a low-noise amplifier (LNA) configured to receive an inbound signal at an input of the LNA; and
a self-interference cancellation module configured to cancel interference from the outbound signal in the inbound signal at the input of the LNA, the self-interference cancellation module comprising:
resistances, coupled using one or more corresponding first switches, between the differential output of the first PA and the input of the LNA; and
one or more capacitances, coupled using one or more corresponding second switches, between the differential output of the first PA and the input of the LNA,
wherein the resistances include a first adjustable resistance controllably coupled between a first differential end of the differential output of the PA and the input of the LNA, and a second adjustable resistance controllably coupled between a second differential end of the differential output of the PA and the input of the LNA.

16. The apparatus of claim 15, further comprising a digital signal processor (DSP) configured to control adjustment of the phase and gain of the outbound signal based on a phase and gain of the interference from the outbound signal in the inbound signal.

17. The apparatus of claim 15, wherein the resistances of and the one or more capacitances are configured to be adjusted to adjust the gain and phase of the outbound signal provided at the differential output of the PA.

18. The apparatus of claim 15, wherein the apparatus is a wireless transceiver further comprising an antenna coupled to the differential output of the PA and coupled to the input of the LNA.

19. The apparatus of claim 15, wherein the one or more capacitances include:
- a first adjustable capacitance controllably coupled between the first differential end of the differential output of the PA and the input of the LNA; and
- a second adjustable capacitance controllably coupled between the second differential end of the differential output of the PA and the input of the LNA.

* * * * *